(12) United States Patent
Thomas et al.

(10) Patent No.: US 8,205,190 B2
(45) Date of Patent: Jun. 19, 2012

(54) DATA PROCESSING SYSTEM AND METHOD

(75) Inventors: John Thomas, Bangalore Karnataka (IN); Rupa Ramakrishna, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1178 days.

(21) Appl. No.: 12/021,998

(22) Filed: Jan. 29, 2008

(65) Prior Publication Data

US 2008/0184205 A1    Jul. 31, 2008

(30) Foreign Application Priority Data

Jan. 31, 2007   (IN) .............................. 211/CHE/2007

(51) Int. Cl.
*G06F 9/44* (2006.01)

(52) U.S. Cl. ...................................................... 717/121
(58) Field of Classification Search ........................ None
See application file for complete search history.

(56) References Cited

U.S. PATENT DOCUMENTS

2004/0107416 A1    6/2004   Buban et al.

OTHER PUBLICATIONS

"Checking for running applicaton before install?", NewsArchive, http://community.acresso.com/archive/index.php?t-82455.html, dated Mar. 27, 2001, retrieved from http://community.acresso.com/archive/index.php?t-82455.html on Sep. 27, 2011.*

* cited by examiner

*Primary Examiner* — Philip Wang

(57) ABSTRACT

A method of patching at least one function of an executing program, comprising determining when the at least one function is not being executed; and replacing original code in the at least one function with patched code.

13 Claims, 6 Drawing Sheets

DATA PROCESSING SYSTEM AND METHOD

RELATED APPLICATIONS

This patent application claims priority to Indian patent application serial no. 212/CHE/2007, titled "Data Processing System and Method", filed in India on 31 Jan. 2007, commonly assigned herewith, and hereby incorporated by reference.

BACKGROUND TO THE INVENTION

Computer programs can be modified or "patched" to replace at least some of the original code in the computer program with patched code. A computer program may be patched to add features, correct errors and/or improve the performance of the program.

Where a computer program is executing on a data processing system and at least a portion of the computer program is to be patched, or a portion of code that is called by the computer program is to be patched, the computer program is blocked from calling functions within the portion, even if not all of the functions within the portion need to be patched. This may lead to downtime of the computer program.

Another patching method loads patched code into a data processing systems memory, and modifies code within the function to be patched such that it calls the patched code instead of executes the original function code. However, once the patch is applied, the data processor may still be executing the unpatched code. Also, this patching method is memory inefficient as the original code is redundant but is still located within the memory.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Methods according to embodiments of the invention may be used to patch a program that is executing on a data processing system. When a program is to be patched, the patched code is provided to the data processing system in the form of, for example, a patch binary file that is readable by the data processing system. The patch binary file may also include instructions for implementing the patching method on the data processing system. The patch binary file includes patched code, or contains instructions for producing the patched code. The patched code is intended to replace original code that forms part or all of one or more functions within the executing program and/or called by the executing program.

For example, the patch binary file may include the patched code and an executable portion that provides instructions for patching an executing program. Alternatively, the patch binary file may contain only the patched code, and does not include an executable portion. The instructions for patching the executing program may therefore be provided to the data processing system, for example in another file or as part of an operating system. A patch binary file without an executable portion may be of reduced size compared to a patch binary file with an executable portion.

Figure 1:
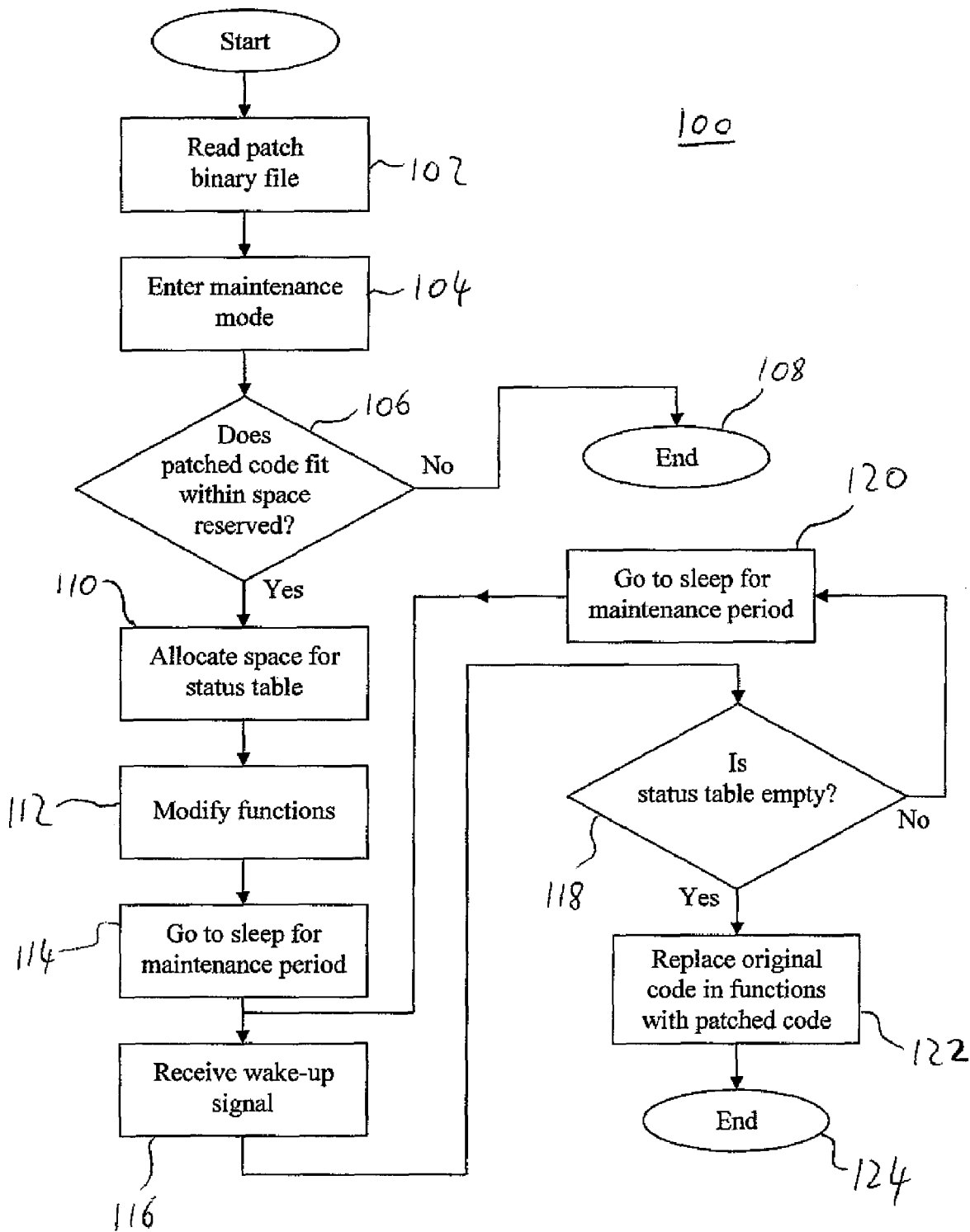
FIG. 1 shows a patching method for patching an executing program according to embodiments of the invention.

An example of a patching method 100 according to an embodiment of the invention is shown in FIG. 1. The method starts at step 102, where the data processing system reads the patch binary file. The patch binary file may be provided to the data processing system using, for example, computer readable storage such as flash memory, optical storage or a floppy disk, or using a network connection such as a wired or wireless LAN or WAN, or using some other method of providing the file to the data processing system.

In step 104, which follows from step 102, the data processing system enters maintenance mode, indicating that the patching process has begun. The method then proceeds to step 106, where the data processing system determines whether the patched code fits within the space reserved. The patched code for each function to be patched must fit within the space reserved for the function. The space reserved for a function is the amount of memory of the data processing system that is occupied by the original code for the function. If the patched code does not fit within the space reserved then patching cannot go ahead, and the patching method ends at step 108. The size of the patched code for each function can be included in the patch binary file, or otherwise provided to or determined by the data processing system.

Figure 2:
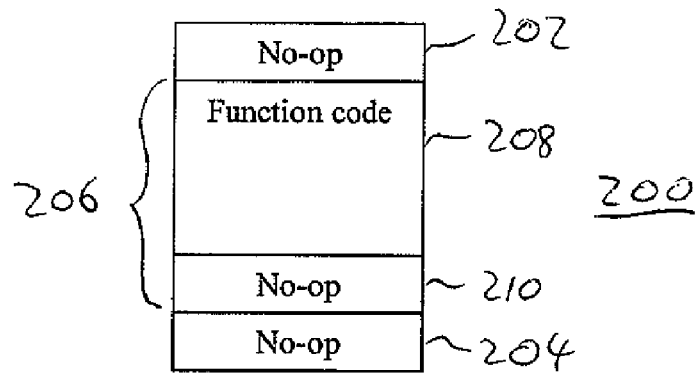
FIG. 2 shows the structure of a function to be patched.

The structure of a function 200 in the memory of the data processing system is shown in FIG. 2. The function 200 comprises a first portion of padding code 202 at the start of the function, and a second portion of padding code 204 at the end of the function. The function 200 also comprises original code 206. The original code 206 comprises function code 208 and a third portion of padding code 210. The function code 208 contains instructions to cause the data processing system to carry out the function. The portions of padding code 202, 204 and 210 comprise no-op instructions. The first 202 and second 204 portions of padding code are replaced with calls to routines during the patching process as indicated in more detail later. The third portion of padding code 210 is present to increase the size of the original code 206. For example, the padding code 210 may comprise 5% of the original code 206. The increased size of the original code 206 enables patched code to replace the original code 206 where the patched code is larger than the function code 208. The third portion of padding code 210 may be located at the start or the end of the original code 206 or may be distributed throughout the original code 206. The third portion of padding code may be inserted into executable files associated with the function (such as, for example, by a compiler), inserted as the function is loaded into memory, or inserted otherwise. The third portion of padding code 210 may be omitted where it is guaranteed that any patched code will be smaller in size than the function code 208. The function may also include instructions (not shown) that follow the second portion of padding code 204, and return to the thread that called the function.

Referring back to FIG. 1, if the patched code fits within the space reserved, then the method proceeds from step 106 to step 110 where a status table is created. The status table contains a row for each function to be patched. The status table indicates which threads have called the functions to be patched as indicated below.

From step 110, the method proceeds to step 112 where the functions to be patched are modified. In this step, each function to be patched is modified such that it has the structure of the function 300 shown in FIG. 3. The function 300 has the same structure as the function 200 of FIG. 2, except that the function has been modified in this step to replace the first portion of padding code 202 with a call 302 to a common entry routine, and to replace the second portion of padding code 204 with a call 304 to a common exit routine. All of the functions to be patched are modified to call the same common entry and exit routines.

Figure 3:
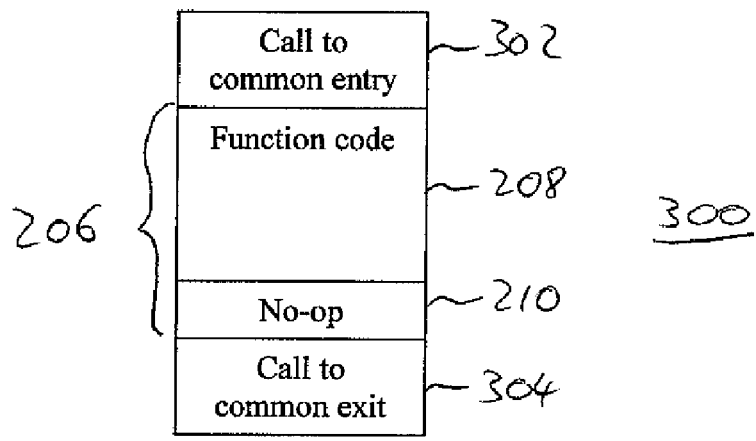
FIG. 3 shows the structure of a modified function.

When a modified function to be patched is called by a thread of the executing program, the common entry routine is immediately called as the instructions 302 for calling the common entry routine are found at the start of the function, as shown in FIG. 3. The common entry routine adds the thread ID of the calling thread to the status table in the row corresponding to the called function. The status table may be implemented, for example, as a linked list so that multiple entries can be added and removed for each function. The status table does not include information relating to functions that are not to be patched, and such functions may be executed normally and are not affected by embodiments of the invention, even when the system is in maintenance mode or the functions to be patched are being patched.

The common exit routine is called when the function finishes execution and returns to the calling thread. The common exit routine removes the thread ID of the calling thread from the row of the status table corresponding to the called function. Therefore, the status table comprises an up-to-date list of the functions that have started executing since the data processing system entered maintenance mode, and have not yet finished executing. The thread ID of a thread may be present in multiple times in the status table, and/or multiple times in the same row of the status table, corresponding to the number of fixations that the thread called and the number of times that the thread called each function.

Referring back to FIG. 1, once the functions to be patched have been modified in step 112, the method 100 proceeds to step 114. In step 114, the patching thread that is executing on the data processing system to implement the patching method sleeps for a maintenance period. The maintenance period is chosen or calculated to be at least as long as the maximum execution time of the functions to be patched. Therefore, once the maintenance period has elapsed, any functions that were executing before the data processing system entered maintenance mode will have finished executing. This is useful because the status table will not indicate functions that were called before the system entered maintenance mode, as the functions did not include instructions 302 to call the common entry routine at the time they were called.

Thus, at the end of the maintenance period, the status table indicates which functions to be patched are executing and which functions are not executing.

Once the maintenance period has elapsed, the patching thread receives a wake-up signal (for example, from an operating system running on the data processing system) in step 116, which follows on from step 114. The method 100 then proceeds to step 118, where the patching thread checks the status table to determine whether it is empty. If the status table is not empty, then some of the functions to be patched are being executed. If this is the case, then the method 100 proceeds from step 118 to step 120, where the patching thread sleeps until it receives a wake-up signal. The method proceeds to step 116 when the patching thread receives a wake-up signal from the common exit routine as indicated in more detail below, and then proceeds to step 118 when the patching thread checks the status table once again.

Figure 4:
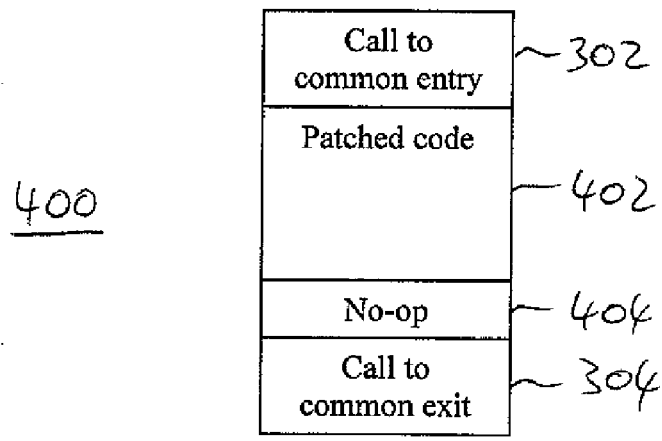
FIG. 4 shows the structure of a modified function with the original code replaced.

If in step 118 the patching thread determines that the status table is empty, then none of the functions to be patched are being executed. This is the "synchronisation point". Patching can take place at this point as the patched code will not replace code that is being executed. The patching thread thus begins patching the functions to be patched in step 122 of the method 100 of FIG. 1. To patch a function, the patching thread replaces the original code (such as code 206 in FIGS. 2 and 3) in memory with patched code and a portion of padding code. FIG. 4 shows a function 400 where the original code 206 has been replaced with patched code 402 and a portion of padding code 404. The padding code 404 is present to ensure that the memory space occupied by the patched code 402 and the padding code 404 matches that occupied by the original code 206. Thus, the padding code 404 is not required where the patched code 402 is the same size as the original code 206.

Figure 5:
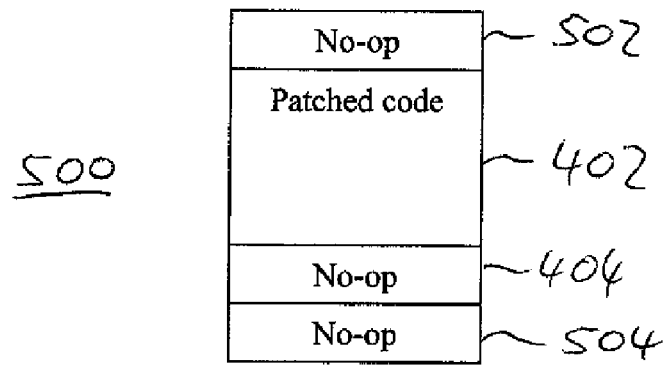
FIG. 5 shows the structure of a patched function.

Once the patched code 402 and padding code 404 have been inserted at the appropriate place in memory, the patching thread replaces the calls 302 and 304 to common entry and exit routines respectively with padding code. FIG. 5 shows a function 500 where the calls 302 and 304 have been replaced by padding code 502 and 504 respectively. The function 500 is a fully patched function and can be called by the executing program.

The patching thread patches each of the functions to be patched as indicated above, and once all of the functions have been patched, the patching thread finishes patching the functions. The data processing system then comes out of maintenance mode, and the method of FIG. 1 ends at step 124.

Figure 6:
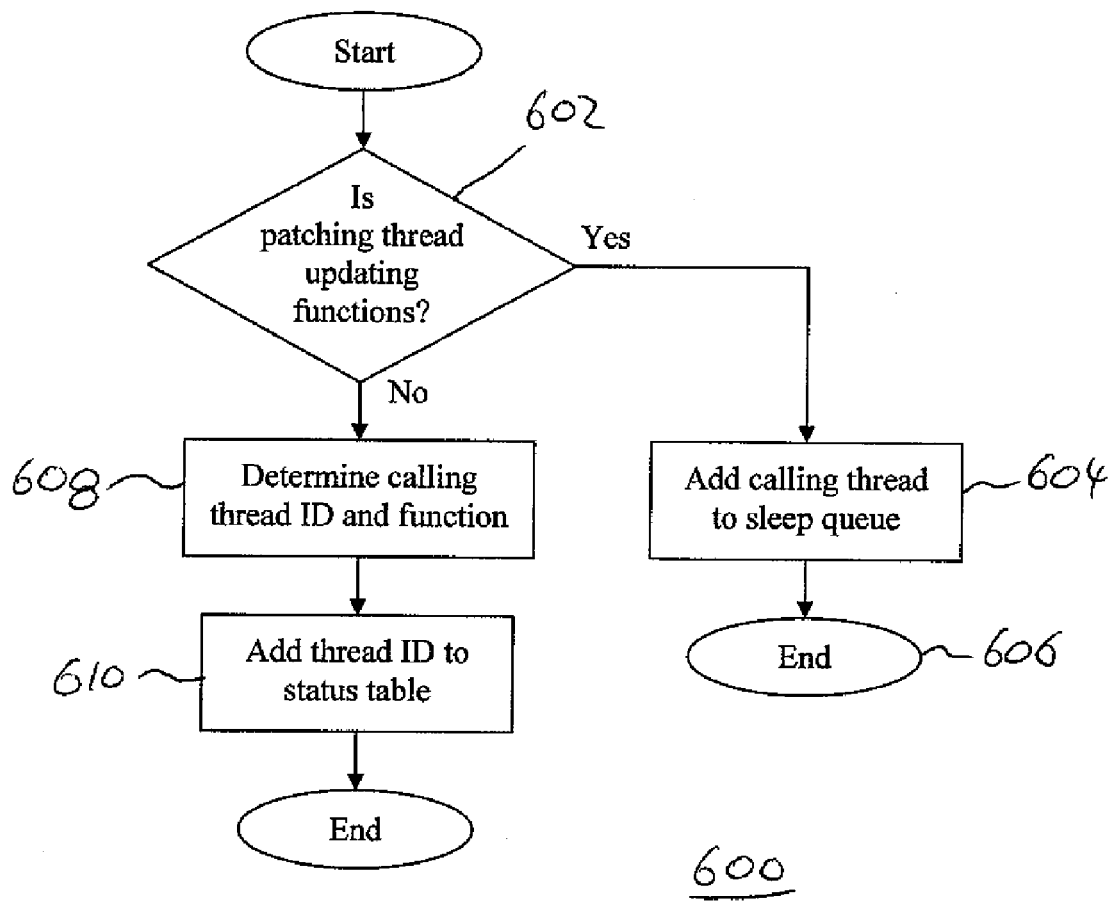
FIG. 6 shows an example of a common entry routine.

If the patching thread is in the process of patching functions, then it is undesirable for the program executing on the data processing system to call any of the functions to be patched. Therefore, the common entry routine for each function sends threads that call such functions to sleep until the patching thread has finished patching the functions. FIG. 6 shows an example of a common entry routine 600. This routine is called when a function to be patched is called by a thread of the executing program, provided that the functions to be patched have been modified in step 112 of the method 100 of FIG. 1. The common entry routine starts at step 602 where the routine determines whether the patching thread is in the process of patching the functions to be patched. If this is the case, then the routine proceeds to step 604 where the routine 600 sleeps the thread that called the function to be patched. The routine then ends at step 606. Threads that are slept in this way can be woken when the patching process ends.

If the routine 600 determines in step 602 that the patching thread is not yet patching the functions to be patched, then the routine 600 proceeds from step 602 to step 608 where the called function and the ID of the calling thread are determined. The routine 600 then proceeds to step 610 where the ID of the calling thread is added to the status table in the row corresponding to the called function to be patched. The routine then ends at step 612.

Figure 7:
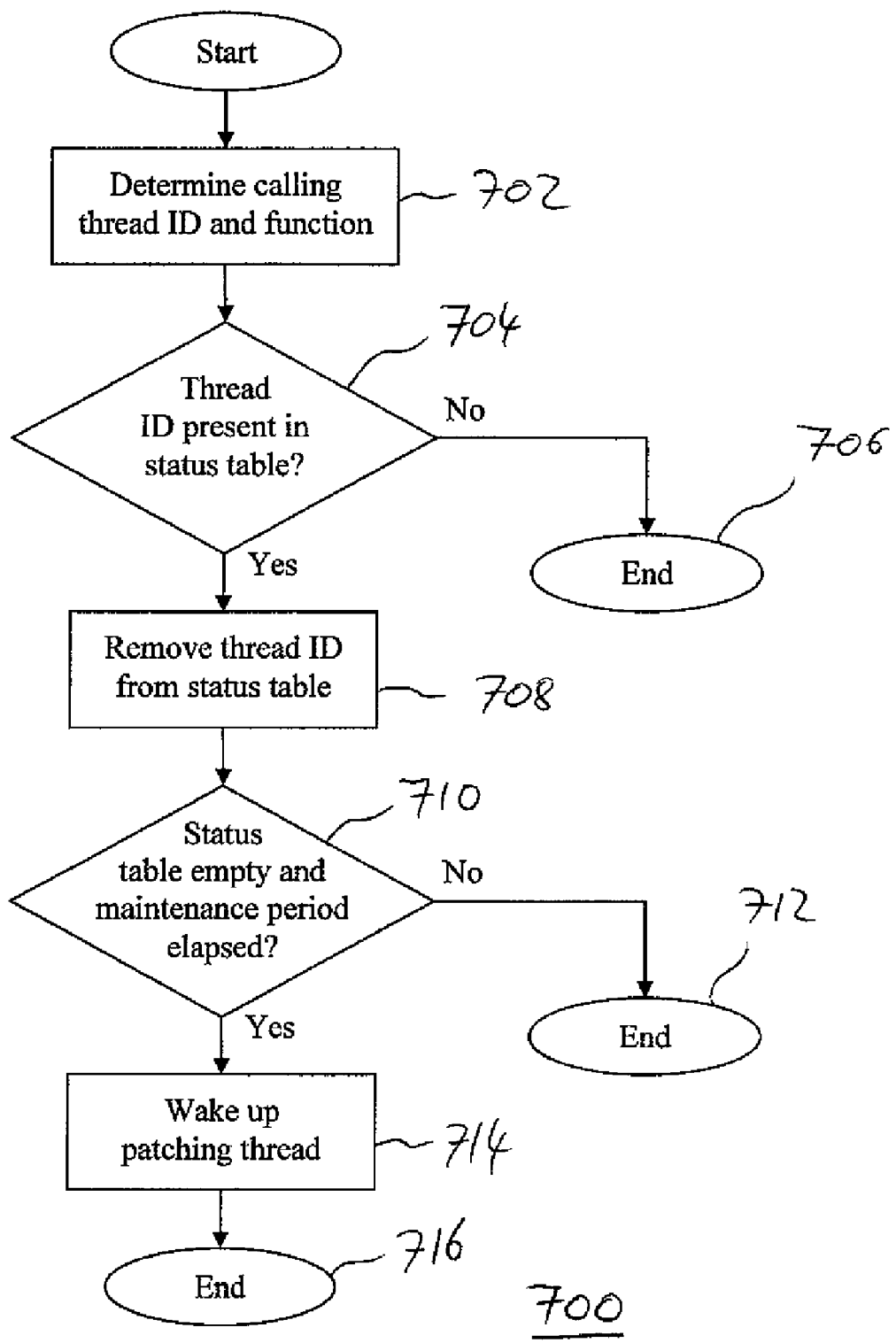
FIG. 7 shows an example of a common exit routine.

FIG. 7 shows an example of a common exit routine 700 which is called when the functions to be patched finish executing, provided that the functions to be patched have been modified in step 112 of the method 100 of FIG. 1. The routine 700 begins at step 702 where the called function and the ID of the calling thread are determined. The routine 700 then proceeds to step 704 where the routine determines whether the thread ID is present in the status table in the row corresponding to the called function. If this is not the case, then the function was called by the executing program before the data processing system entered maintenance mode. The routine 700 then ends at step 706.

If the routine 700 determines in step 704 that the calling thread ID is in the appropriate row of the status table, then the routine 700 proceeds from step 704 to step 708 where the routine 700 removes the thread ID from the appropriate row of the status table. Next, at step 710 the routine 700 determines whether the status table is now empty and whether the status period has elapsed. If it is not empty, and/or the status period has not elapsed, then the routine 700 ends at step 712. If it is empty and the status period has elapsed, then none of the functions to be patched are executing. Therefore, the routine 700 proceeds from step 710 to step 714, where the routine 700 sends a wake-up signal to the patching thread. The routine 700 then ends at step 716.

In certain embodiments of the invention, the patching thread may implement the patching method 100 of FIG. 1 or, alternatively, a patching method according to other embodiments of the invention. Alternatively, the data processing system may include or be provided with instructions for implementing at least part of the patching method. Similarly, the common entry and exit routines may be provided with the patch binary file, or may be otherwise present on or provided to the data processing system.

In certain embodiments, the patching method updates (for example, by modification or replacement) one or more files on a permanent storage, such as a hard disk, of the data processing system, the files being associated with the executing program. Therefore, in the event that the files are loaded into memory so as to become an executing program, the new program will contain the patched functions in place of the original code. The information to update the files may be provided with the patch binary file or otherwise.

Figures 8, 9, 10:
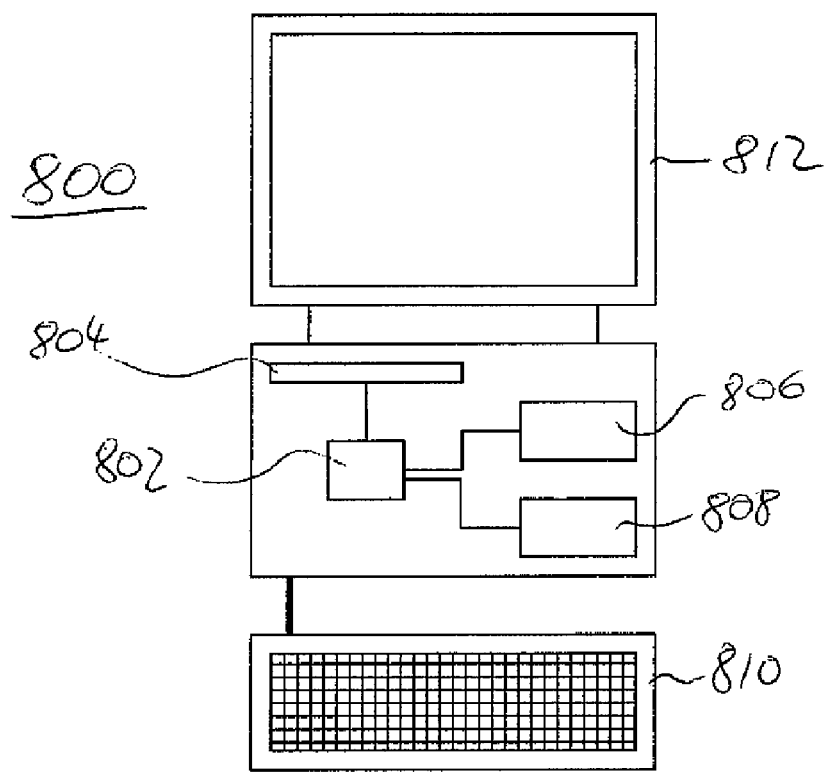
FIG. 8 shows an example of a data processing system suitable for implementing embodiments of the invention.
FIG. 9 shows an example of an empty status table.
FIG. 10 shows an example of a status table where a function a has been called by a thread T1.

FIG. 8 shows an example of a data processing system 800. The data processing system 800 comprises a data processor 802 and memory 804. The system 800 also comprises a permanent storage device 806 such as, for example, a hard disk, and a communications device 808 that enables the data processing system to communicate with a wired and/or wireless network, such as a LAN, WAN, internet or other network. The data processing system may include an input device 810 such as a keyboard and/or mouse, and a display device 812. A data processing system suitable for implementing embodiments of the invention may exclude any of the components of the system 800 and/or include further components.

FIG. 9 shows an example of a status table 900 that is created in step 110 of the method 100 of FIG. 1, where three functions A, B and C are to be patched. The status table contains a row for each of the functions A, B and C. The status table is empty as the first entry in each row points to NULL.

Consider that a thread T1 of a program executing on the data processing system calls the function A while the system is in maintenance mode, but before the maintenance period has elapsed. The thread ID of T1 will be added to the status table in the row corresponding to the function A. The resulting status table 1000 is shown in FIG. 10.

Figure 11:
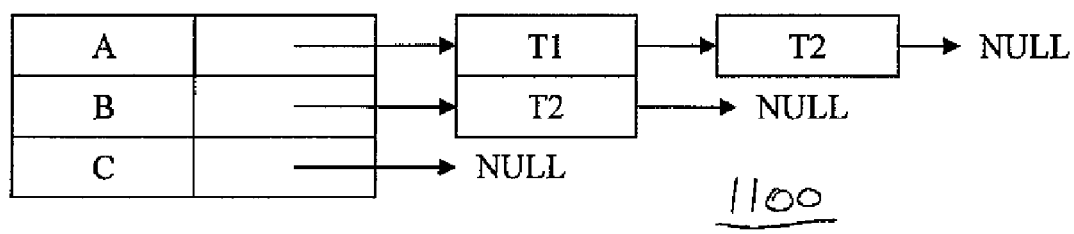
FIG. 11 shows an example of a status table where the functions a and b have been called by a thread T2.

If a second thread T2 subsequently calls the functions A and B before the function A (called by T1) has finished executing, then the thread ID of T1 will be added to the rows of the status table corresponding to the functions A and B. The resulting status table 1100 is shown in FIG. 11. The row corresponding to the function A has two entries, T1 and T2, which shows that both T1 and T2 have called the function A, and the function A has not finished executing in respect of T1 or T2.

Figure 12:
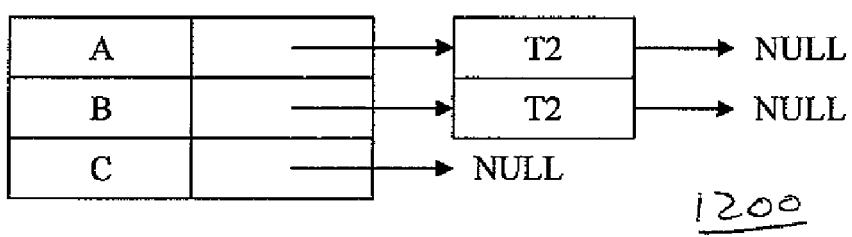
FIG. 12 shows an example of a status table where a function a called by a thread T1 has finished executing.

If the function A, called by T1, finishes executing, then the thread ID of T1 will be removed from the appropriate row of the status table. The resulting status table 1200 is shown in FIG. 12, which shows that the row corresponding to the function A now only has a single entry, T2. This shows that even though the function A has finished executing in respect of T1, the function A has not finished executing in respect of T2. Once the function A has finished executing in respect of T2, and the function B has also finished executing, then the patching process can proceed to patch the functions A, B and C, provided that the functions have not been called again and the maintenance period has elapsed.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of patching at least one function of an executing program, comprising:
   determining, at a computer system, comprising a processor executing instructions in a memory, when the at least one function is not being executed;

replacing, at said computer system, original code in the at least one function with patched code; and modifying, at said computer system, the at least one function to update a status table when the at least one function is being executed, wherein the at least one function comprises padding code, and modifying the function comprises modifying the padding code such that the function updates the status table when execution of the at least one function begins and ends.

2. The computer-implemented method as claimed in claim 1, wherein determining when the at least one function is not being executed comprises waiting for a maintenance period.

3. The computer-implemented method as claimed in claim 2, wherein the maintenance period is at least as long as a maximum execution time of the at least one function.

4. The computer-implemented method as claimed in claim 1, wherein determining when the at least one function is not being executed comprises determining when the status table indicates that the at least one function is not being executed.

5. The computer-implemented method as claimed in claim 4, wherein modifying the at least one function comprises inserting code into the at least one function that checks whether the status table indicates that the at least one function is not being executed when execution of the at least one function ends.

6. The computer-implemented method as claimed in claim 1, comprising, while replacing the original code, forcing threads that call the at least one function to sleep.

7. A non-transitory computer readable storage medium having instructions embodied therein that when executed cause a computer system to patch at least one function of an executing program, said instructions comprising:

code for determining when the at least one function is not being executed;

code for replacing original code in the at least one function with patched code; and code for modifying the at least one function to update a status table when the at least one function is being executed, wherein the at least one function includes padding code, and the code for modifying the function comprises code for modifying the padding code such that the function updates the status table when execution of the at least one function begins and ends.

8. The non-transitory computer readable storage medium of claim 7, wherein the code for determining when the at least one function is not being executed comprises code for waiting for a maintenance period.

9. The non-transitory computer readable storage medium of claim 8, wherein the maintenance period is at least as long as a maximum execution time of the at least one function.

10. The non-transitory computer readable storage medium of claim 7, wherein the code for determining when the at least one function is not being executed comprises code for determining when the status table indicates that the at least one function is not being executed.

11. The non-transitory computer readable storage medium of claim 10, wherein the code for modifying the at least one function comprises code for inserting code into the at least one function that checks whether the status table indicates that the at least one function is not being executed when execution of the at least one function ends.

12. The non-transitory computer readable storage medium of claim 7, comprising code for forcing threads that call the at least one function to sleep while the code for replacing the original code is being executed.

13. The non-transitory computer readable storage medium of claim 7, comprising the patched code.

\* \* \* \* \*

UNITED STATES PATENT AND TRADEMARK OFFICE
CERTIFICATE OF CORRECTION

PATENT NO. : 8,205,190 B2
APPLICATION NO. : 12/021998
DATED : June 19, 2012
INVENTOR(S) : John Thomas et al.

It is certified that error appears in the above-identified patent and that said Letters Patent is hereby corrected as shown below:

On the Title page, in Item (30), Under "Foreign Application Priority Data", in column 1, line 1, delete "211/CHE/2007" and insert -- 212/CHE/2007 --, therefor.

Signed and Sealed this
Twenty-second Day of October, 2013

Teresa Stanek Rea
*Deputy Director of the United States Patent and Trademark Office*